(12) United States Patent
Lindsay

(10) Patent No.: US 7,133,946 B2
(45) Date of Patent: Nov. 7, 2006

(54) MECHANISM TO REPEAT SIGNALS ACROSS AN UNRELATED LINK

(75) Inventor: Dean T. Lindsay, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 10/811,551

(22) Filed: Mar. 29, 2004

(65) Prior Publication Data

US 2005/0216629 A1   Sep. 29, 2005

(51) Int. Cl.
*G06F 13/42* (2006.01)
(52) U.S. Cl. .................................... 710/105
(58) Field of Classification Search ................ 710/105
See application file for complete search history.

(56) References Cited

U.S. PATENT DOCUMENTS 5,805,403 A * 9/1998 Chemla ..................... 361/103
6,108,729 A   8/2000 Maguire et al.
6,309,040 B1 * 10/2001 Norton ........................... 347/9
6,667,868 B1 * 12/2003 Portaluri et al. ............ 361/103
6,996,032 B1 * 2/2006 Ganry ......................... 368/118
2002/0075977 A1 * 6/2002 Koga ......................... 375/354
2003/0189973 A1 * 10/2003 Doblar et al. .............. 375/215
2004/0117707 A1 * 6/2004 Ellis et al. .................. 714/733
2004/0117708 A1 * 6/2004 Ellis et al. .................. 714/733

OTHER PUBLICATIONS

PCT Search Report, PCT/US2005/009952, mailed Sep. 12, 2005.

* cited by examiner

*Primary Examiner*—John R. Cottingham
*Assistant Examiner*—Christopher A. Daley
(74) *Attorney, Agent, or Firm*—Blakely, Sokoloff, Taylor & Zafman LLP

(57) ABSTRACT

According to one embodiment a system is disclosed. The system includes a first integrated circuit (IC) a first interface coupled to the first IC and a second IC coupled to the interface. The first IC transmits the state of each of a plurality of signals not associated with the interface to the second IC in-band via the interface each time that a change in the state of one of the plurality of signals is detected.

24 Claims, 6 Drawing Sheets

MECHANISM TO REPEAT SIGNALS ACROSS AN UNRELATED LINK

FIELD OF THE INVENTION

The present invention relates to integrated circuits; more particularly, the present invention relates to interfacing integrated circuits.

BACKGROUND

Integrated circuits (ICs) are commonly connected together into a system by interfaces for data transfer and control. Such interfaces may include buses and point-to-point links. Typically, there are additional signals, not directly related to the links, which are implemented to coordinate the actions of the ICs. Such signals include error and debug signals, among other types of signals.

When these signals are run as physical wires, each separate wire must have its own pins, timing specs, voltage specs, etc., which complicates the IC transmitting and the IC receiving the signal. Current systems implement unassigned protocol points on the existing buses or links connecting the ICs to communicate the same information between ICs which would have been carried on discrete wires, thus simplifying the physical interfaces between ICs by eliminating the additional wires.

Such a mechanism is referred to as in-band signaling because the additional information, although not protocol related, is carried as part of the protocol signaling, and thus is in-band to the protocol. For example, one protocol point might indicate that "debug signal A asserted." Another protocol point would indicate that "debug signal A deasserted". When a first IC needs to communicate that debug signal A has been asserted to a second IC, the message "debug signal A asserted" is transmitted in the ongoing protocol stream from the first IC to the second IC. When debug signal A deasserts, the first IC sends "debug signal A deasserted" to the second IC.

Although this mechanism of conveying signals between ICs without adding additional wires provides many benefits, there are also significant disadvantages, such as when a number of signals are being transmitted between ICs in this manner.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A mechanism to repeat signals across an unrelated link is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
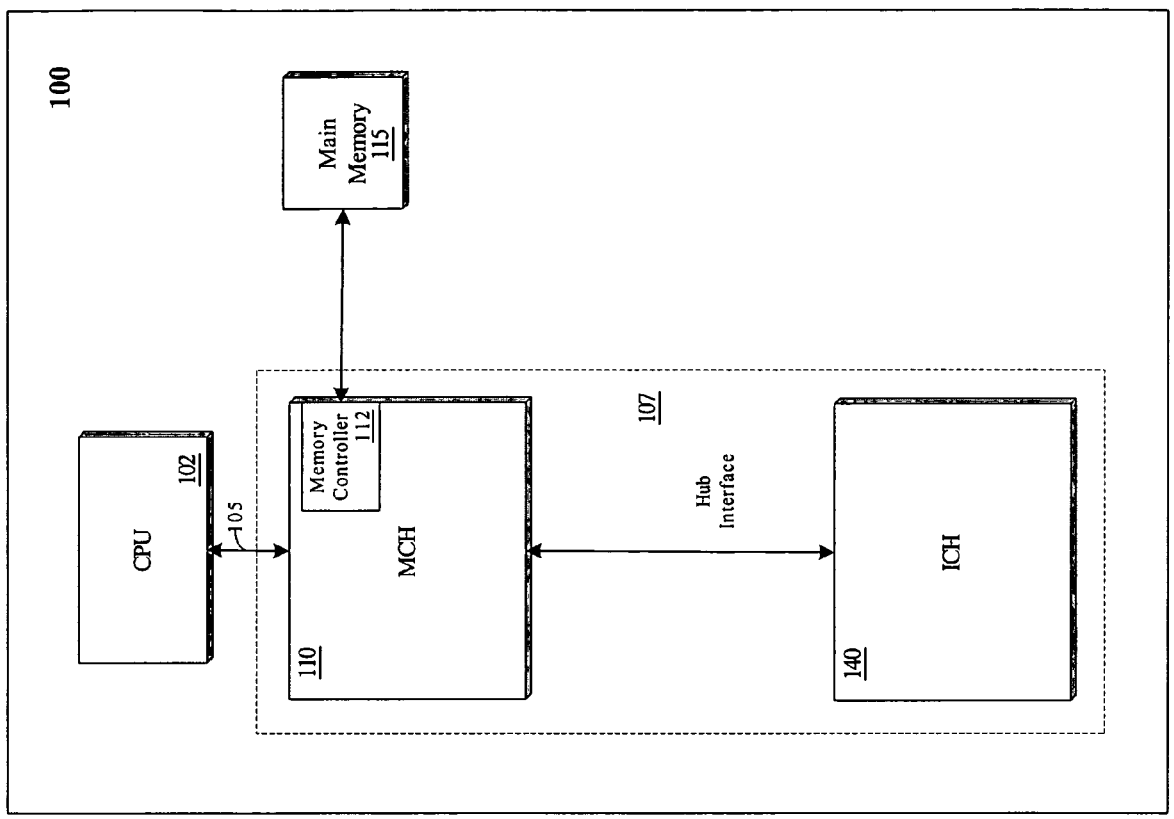
FIG. 1 illustrates one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. In one embodiment, MCH 110 is coupled to an input/output control hub (ICH) 140 via a hub interface. ICH 140 provides an interface to input/output (I/O) devices within computer system 100. For instance, ICH 140 may be coupled to a Peripheral Component Interconnect bus adhering to a Specification Revision 2.1 bus developed by the PCI Special Interest Group of Portland, Oreg.

In one embodiment, MCH 110 includes a memory controller 112 that is coupled to a main system memory 115. Main system memory 115 stores data and sequences of instructions and code represented by data signals that may be executed by CPU 102 or any other device included in system 100. In one embodiment, main system memory 115 includes dynamic random access memory (DRAM); however, main system memory 115 may be implemented using other memory types.

According to one embodiment, MCH 110 and ICH 140 are implemented on separate ICs that are coupled via the hub interface. However, there may be additional signals (e.g., error signals, debug signals, etc.) not related to the hub interface that may be needed to coordinate MCH 110 and ICH 140. These signals generally have the following characteristics: 1) transitions can occur on any clock cycle; 2) limited latency is permissible between the time when a signal asserts and when the signal is observed by another IC; 3) the timing of the first transition from steady state is important, signaling the beginning of a condition, whereas the timing of the return-to-steady-state transition is less important; 4) each signal changes infrequently, but multiple signals may change on nearby clock cycles, and preserving the relative timing of the signal changes to each other is important.

As discussed above, in-band signaling is an existing mechanism implemented to communicate information between ICs. A disadvantage occurs using in-band signaling when multiple signals passed using in-band signaling change state at the same or nearly the same time (related to the speed of signal transmission by the protocol). In such a case, the protocol serializes the signal information, transmitting the new state of one signal, and then later transmitting the new state of the next signal, until the changes on all signals are communicated.

The result is that actions seen at essentially the same time in one IC are seen sequentially in time at the other IC. For example, suppose that a first IC (IC 1) and a second IC (IC 2) are connected by a link with a communicating protocol. Suppose that the values of two signals, A and B, are of interest to both ICs. The signals exist in IC 1 and will be communicated in-band across the link to IC 2, although the signals are not related to the operation of the link. When A alone asserts in IC 1, this is signaled to IC 2 with the "A asserted" message, and IC 2 knows that A asserted within 1 link latency of when it occurred. The same occurs when signal B alone asserts, and IC 2 knows that B asserted within 1 link latency of when it occurred. However, when A and B assert simultaneously, this cannot be communicated simultaneously, as "A asserted" and "B asserted" are distinct protocol points that cannot be simultaneously communicated.

Figure 5:
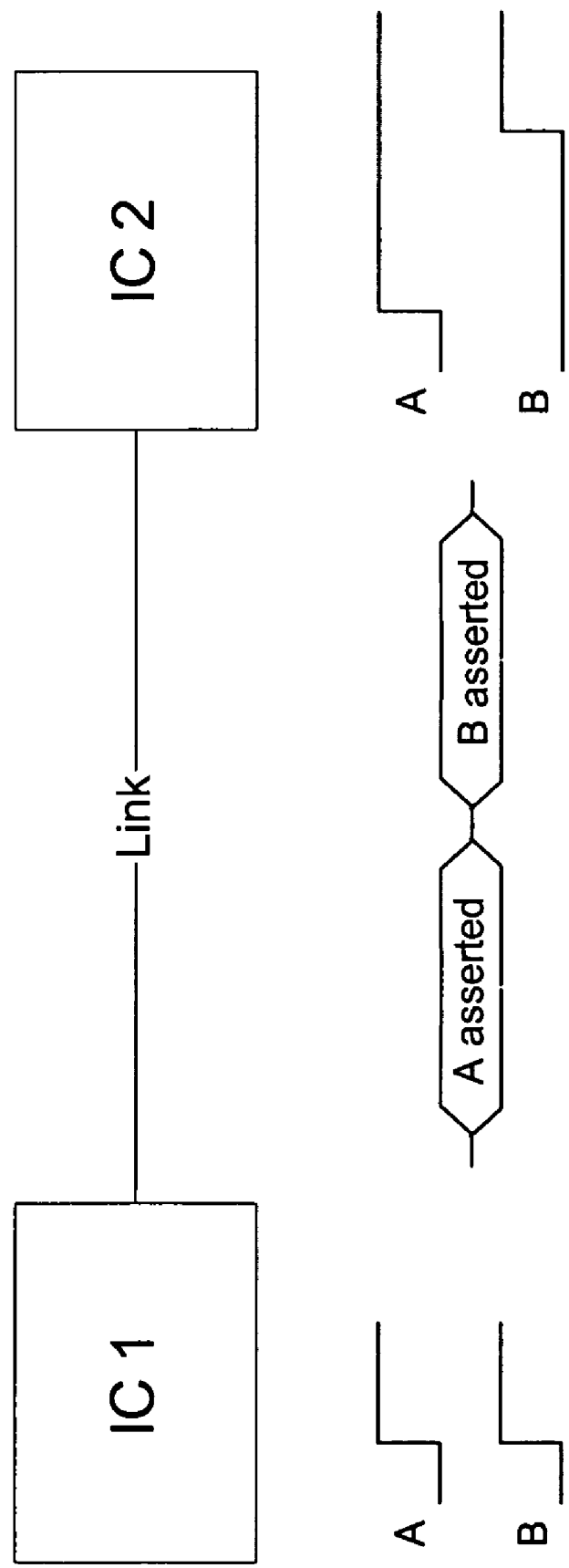
FIG. 5 is a timing diagram showing one embodiment of signal timing.

Consequently, some mechanism must prioritize one signal over the other and serially transmit the state changes. The state change incurred by the signal that is not transmitted must somehow be stored and transmitted at the next opportunity. Thus, the information known in IC 1 that A and B asserted simultaneously is temporally distorted by arriving in IC 2 as A asserted, followed a link latency later by B asserted. This temporal distortion in IC2 is illustrated in FIG. 5.

Figure 6:
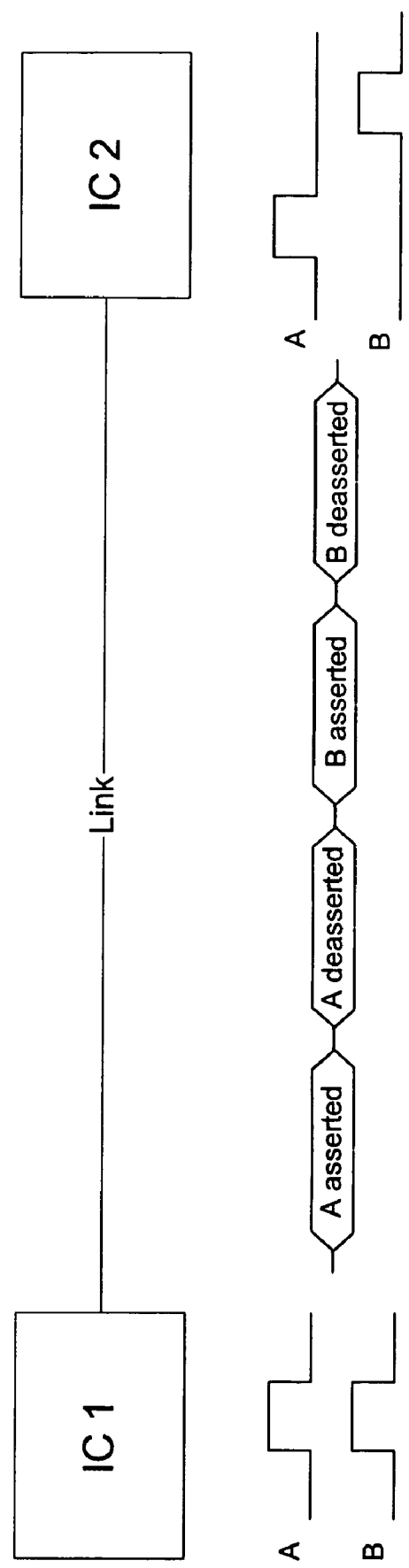
FIG. 6 is a timing diagram showing another embodiment of signal timing.

The above described example would be further complicated if signals A and B assert and deassert simultaneously, and changes on signal A have priority over changes on signal B. This situation is illustrated in FIG. 6. "A asserted" is chosen to be transmitted first. On the next clock cycle of IC 1, while "A asserted" is being sent, A and B deassert. Now "A deasserted" is chosen to be transmitted. "B asserted" is thus delayed two link message times.

In addition, there are two entries required in the buffer that is remembering to transmit "B asserted" followed by "B deasserted." The buffer can become full and overflow, and the associated error conditions must be handled. The exception conditions to handle the buffers are complicated and prone to design errors. It is therefore possible for the final signal state after a series of transitions to be lost in the buffers so that the receiving IC at the end has the wrong state of one or more of the signals.

Currently, two points are assigned in the protocol per signal, one for assertion and another for deassertion. Thus, 2*N protocol points for N in-band signals are currently implemented. According to one embodiment, protocol points for in-band signal transmissions are changed. In such an embodiment, the state of all in-band signals are transmitted each time that any change is observed on any of the in-band signals. Consequently, $2^n$ protocol points are implemented for N in-band signals (e.g., one protocol point for each possible condition of the N signal lines being transmitted in-band).

In a further embodiment, the state of all in-band signals being transmitted is sampled whenever any of the signals change. Subsequently, the state of all of the signals is transmitted at once in a single protocol point across the interface. In yet a further embodiment, the IC receiving the signals drives all signals with the new values it receives each time an in-band protocol point is received across the interface.

Figure 2:
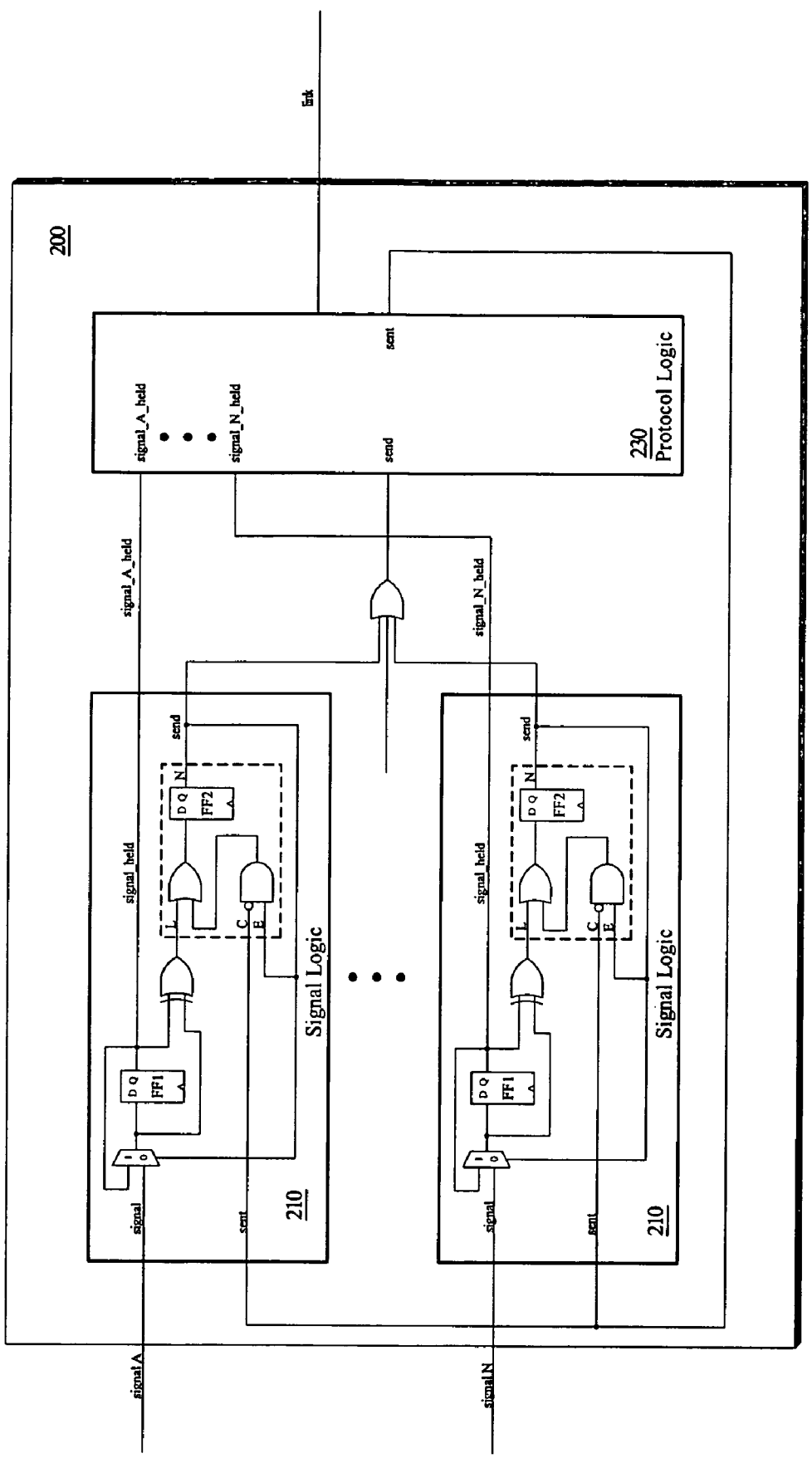
FIG. 2 illustrates one embodiment of a transmitting IC.

FIG. 2 illustrates one embodiment of a transmitting IC 200. In one embodiment, transmitting IC 200 is MCH 110. However, one of ordinary skill in the art will appreciate that transmitting IC 200 may be any other type of IC coupled to another IC via any type of bus or interface. Referring to FIG. 2, IC 200 includes signal logic 210 and protocol logic 230.

In one embodiment, IC 200 includes signal logic 210 for each signal that is to be transmitted to a receiving IC. Thus, signal logic 210(1)–210(n) is included corresponding to signals A–N, where N represents the Nth signal and n represents the corresponding signal logic 210. Signal logic 210 includes the logic that enables each separate signal to be repeated in-band across an interface. Protocol logic 230 is the logic that receives the signals to be repeated in-band and selects an appropriate protocol point and integrates the protocol point into a protocol that is being transmitted across the interface.

According to one embodiment, all signals shown and flip-flops within signal logic 210 and protocol logic 230 operate on a common clock. The description below will focus on signal A and corresponding signal logic 210, with other signals operating in a similar fashion. After initialization, the flip-flop 2 (FF2) in signal logic 210, which drives a send signal, is cleared. This allows signal A to propagate through the multiplexer (mux) to the D input of FF1. One clock cycle later a signal_A_held signal has the same value as signal A. This is the steady-state condition of the circuit.

A change from steady state occurs when signal A asserts after being unasserted for a long time. When signal A asserts, the XOR gate sees different values on its inputs, and its output (L) is asserted. This asserts the D input of a FF2 through the OR gate, which generates a send signal. On the next clock, both the send signal and signal_A_held are asserted. Since both signal A and signal_A_held now have the same value, the output of the XOR gate L is now deasserted.

At the same time, the send signal has become high and because the sent signal was already steady-state low, the AND gate asserts its output to the OR gate, which maintains its output, asserting the D input to FF2. A feedback loop is thus formed from the Q to the D of FF2, which maintains its output constantly asserted as long as the sent signal is low.

Assertion of the send signal also switches the mux so that a feedback loop is formed from the Q output to the D input of FF1. As long as the send signal is asserted, signal A is ignored and the signal_A_held signal maintains the value that it had when the send signal was asserted. As will be discussed below, the send signal remains in this state until the new value of signal A has been repeated across the interface. Thus the mux serves the purpose of ignoring those signal transitions, that occur to close to a previous transition to be repeated across the interface. This is accomplished without the need to buffer signal changes and then discard buffer contents when interface bandwidth does not allow them to be transmitted, as is the case with the prior art.

For protocol logic 230, the values of all signal_X_held signals are observed continuously. Protocol logic 230 also observes the OR of the send signals from each signal logic 210 component. When any send signal asserts, the send input at protocol logic 230 asserts. When the send signal from signal logic 210 corresponding to signal A asserts the send signal at protocol logic 230, protocol logic 230, at the next available opportunity, places the values of all of the signal_X_held signals into a single in-band signaling protocol frame using the protocol point that represents all of their immediate values. Then the sent signal is asserted for a single clock cycle.

When the sent signal arrives at signal logic 210 for signal A, the feedback loop from Q to D for FF2 is broken, and the D input is unasserted. At the next clock cycle, the send signal is deasserted, which switches the mux so that signal A now propagates to the D input of FF1 and to the input to the XOR gate.

Assuming that signal A is still in the same state that was just repeated (or has returned to that state again), the XOR sees the same values on its two inputs, and the circuit has returned to steady-state. However, should signal A now have a different value, the XOR gate detects this and the process described above repeats to transmit this new value across the interface.

It can be seen that when N signals are being repeated in-band across the interface, that they may be changing at any clock cycle relative to each other. On some clock cycles there will be no changes, but there may be one or several changes on other clock cycles. Also, the latency until the repeating interface is able to repeat the changes may be short or long, constant or varying, depending upon the interface design. In any case, the first change causes the interface to prepare to repeat signals.

During the time required by the interface to prepare to repeat the signals, other signals may change state, and their new state will also be repeated once preparation is complete. When the interface is ready, it transmits the states of all signals, including the new state of each signal that has changed up to that time, across the interface at once. The signals are then reevaluated for changes relative to the value that was just repeated across the interface. When new changes are detected the process is repeated.

Figure 3:
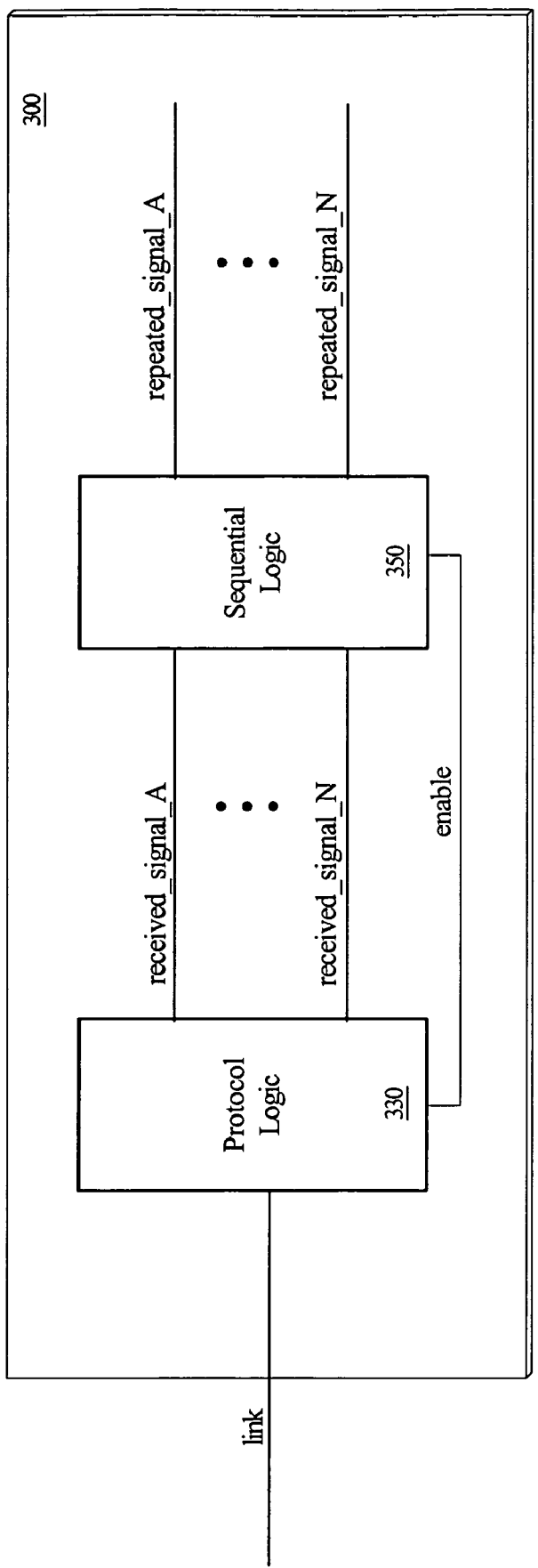
FIG. 3 illustrates one embodiment of a receiving IC.

FIG. 3 illustrates one embodiment of a receiving IC 300. IC 300 includes protocol logic 330 and sequential logic 350. Sequential logic 350 includes a FF dedicated for each repeated signal that is being received. When protocol logic 330 detects an incoming in-band signaling protocol frame, protocol logic 330 extracts the state of all of the received signals and presents this to the D inputs of the FFs at sequential logic 350, at the same time enabling the FFs to accept data with an enable signal. These FFs maintain the repeated signals at the last-written values until the next in-band signaling protocol frame causes them to be updated.

Increasingly, IC links are high speed, and are subject to transmission errors. In-band signal repeating is sometimes inserted into the lower protocol layers for reasons such as minimization of transmission latency and reduction of buffer complexity at higher protocol levels. The result is that in-band signal repeating frames may be lost.

The above-described repeating mechanism transmits one signal-repeating frame for all signal changes that fall within the frame's time window. If that frame is lost, the receiving IC has the wrong state for all signals with changes contained within the lost frame. This condition will persist until another signal changes, and all signal states are again repeated.

A degree of tolerance to loss of in-band signaling protocol frames can be achieved by a simple change to signal logic 210 described above. The change causes multiple frames to be transmitted for each signal change, thus increasing the probability of delivery of the signal change to the receiver.

The number of frames to be transmitted for each signal change can be set to accommodate the expected error rate on the physical link. Transmitting multiple frames for each change uses link bandwidth, but does not require buffering or retry schemes to be implemented. Latency to repeat the signals across the link is minimized because the first correct frame to arrive sets the signal values at the receiver.

Figure 4:
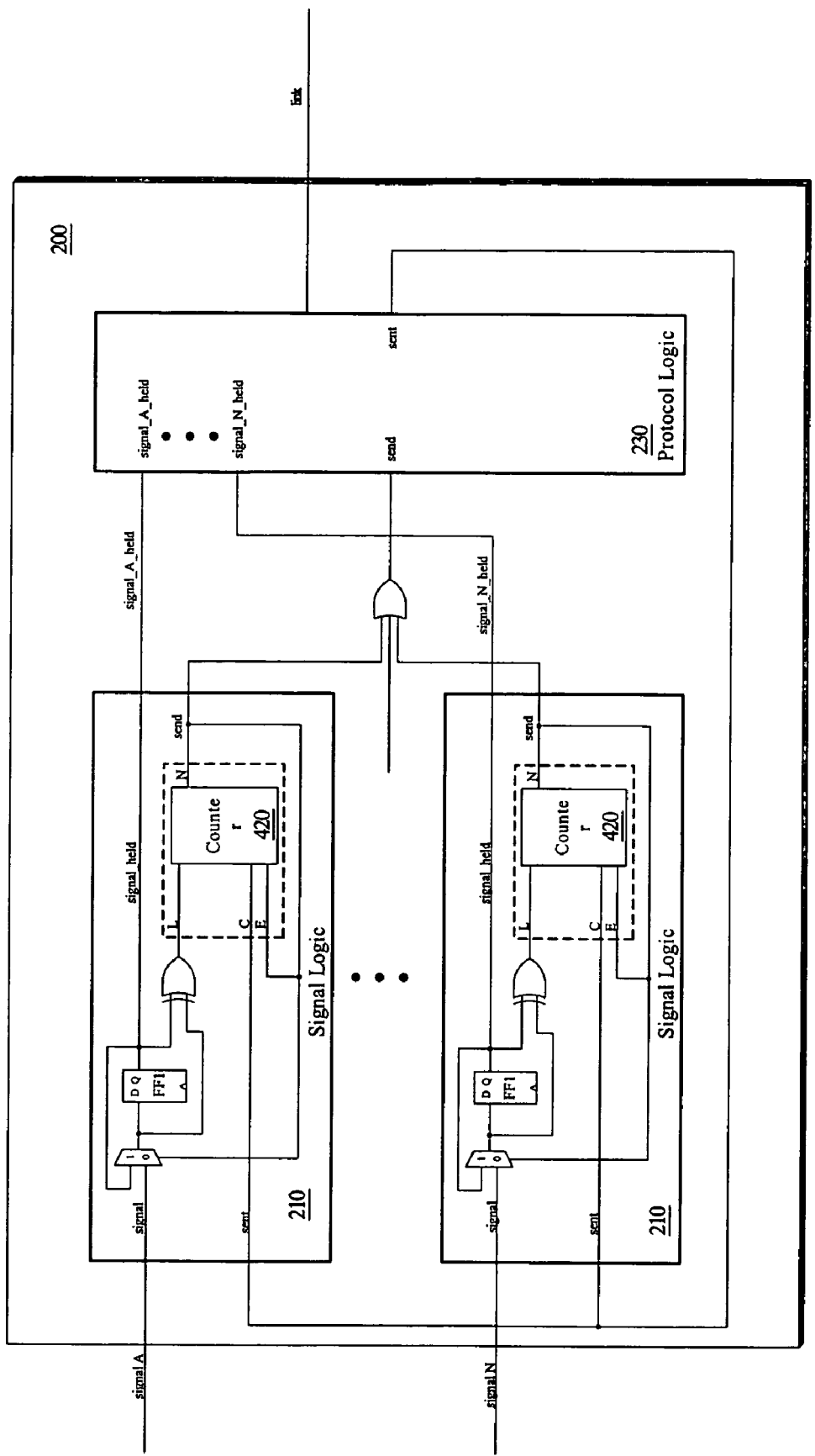
FIG. 4 illustrates another embodiment of a transmitting IC.

FIG. 4 illustrates another embodiment of a transmitting IC 200 including an in-band signaling mechanism that is tolerant of the loss of in-band signaling protocol frames. To implement transmitting multiple frames for each signal change in signal logic 210, the logic within the dotted block (e.g., the Or-gate, And-gate and FF2) is replaced by a loadable countdown counter 420. The signal L is the load signal for counter 420. When L is asserted, counter 420 loads its default value. When signal E is asserted, counter 420 is enabled to count down. For every clock cycle that C is asserted when E is also asserted, counter 420 decrements by one count. Counter 420 output N is asserted whenever the counter value is non-zero.

Counter 420 operates in IC 200 as follows. When the XOR gate asserts as a result of a signal change, L is asserted. L is asserted for only one cycle, as the first clock cycle after the signal change makes the XOR inputs the same. Asserting L loads the default value into the counter on the next clock edge. The default counter 420 value is chosen to balance the link error rate, the impact on the protocol throughput, the importance of the repeated data, etc.

When counter 420 is loaded, its N output asserts because counter 420 is now non-zero. This switches the mux, holding the value of the input signal while it is transmitted. Asserting the N output also asserts signal E, enabling counter 420 to count down based on the assertion of the C input. It also asserts the send signal to protocol logic 230.

Each time that the protocol logic 230 observes the send signal asserted, protocol logic 230 prepares to repeat the signals, captures their values, sends an in-band signaling protocol frame, and asserts the sent signal. The counter 420 in each signal logic 210 component that has experienced a signal change has a non-zero value. The sent pulse decrements each counter 420 in this condition by one count, indicating that the signal change this counter is tracking has been transmitted once over the link. This continues until each such counter reaches 0, N deasserts, counter 420 is disabled (so that it does not underflow), the send signal from signal logic 210 to the protocol logic is deasserted, and the mux switches to watch for further input signal changes.

The above-described mechanism transmits the default number of in-band signal frames for each signal transition. When changes on additional signals occur during the repeating of earlier changes on other signals, these additional changes are immediately incorporated into the next and subsequent in-band signaling frames being sent. The transmission of in-band signaling protocol frames stops once the last-occurring signal change has been repeated the default number of times The receiving IC 300 (FIG. 3) used with the signal logic 210 including a counter is identical to the receiver already described above. In-band signaling protocol frames that are damaged by errors are detected by link checking by protocol logic 330 and are discarded without the enable signal being asserted. Therefore the outputs of the FFs within sequential logic 350, which hold the signal values in IC 300, do not change. The first in-band signaling protocol frame that passes the link checking changes all of the signal FFs to their correct repeated values. Subsequent good frames also write the FFs, but the values are the same so no change is perceived in the signals in IC 300. As long as a single good frame is received, the signals will be correctly repeated.

The above-described mechanisms enable simultaneous signal transitions in a first IC to be simultaneously observed in a second IC after a transmission delay. Further, the need for complex buffers (error-prone design) to hold transitions for later transmission is obviated. This is true even when errors on the intervening link cause some protocol frames to be lost. Moreover, transitions occurring within a few clock cycles of each other on several signals may be transmitted across an interface without overflowing buffers, and without signal transitions being lost in an unpredictable (or difficult to predict) fashion.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A system comprising:
    a first integrated circuit (IC);
    a single link-interface coupled to the first IC; and
    a second IC coupled to the interface, wherein the first IC simultaneously transmits the state of each of a plurality of signals not associated with the interface to the second IC in-band via the interface each time that a change in the state of one of the plurality of signals is detected.

2. The system of claim 1 wherein the state of all of the plurality of signals is sampled at the first IC whenever any of the signals change.

3. The system of claim 1 wherein the second IC drives each of the signals with new values received in-band each time that the plurality of signal values are received.

4. The system of claim 1 wherein the first IC comprises:
    signal logic associated with each of the plurality of signals; and
    protocol logic, coupled to the signal logic associated with each of the signals, to transmit the signal values in-band to the protocol to the second IC.

5. The system of claim 4 wherein the signal logic includes:
    a first flip-flop with an input coupled to an associated signal and an output coupled to the protocol logic, the output of the first flip-flop generating a held signal value; and
    a second flip-flop having an input coupled to the output of the first flip-flop to receive the held signal value, the output of the second flip-flop generating a send signal.

6. The system of claim 4 wherein the signal logic includes:
    a flip-flop with an input coupled to an associated signal and an output coupled to the protocol logic, the output of the flip-flop generating a held signal value; and
    a counter having an input coupled to the output of the flip-flop to receive the held signal value, the output of the second flip-flop generating a send signal.

7. The system of claim 4 wherein the protocol logic selects a protocol point including all of the held signal values simultaneously and integrates the protocol point into a protocol that is transmitted to the second IC via the interface.

8. The system of claim 7 wherein the protocol point being transmitted is changed each time an additional signal transitions so that subsequent signal transitions are communicated with a short a latency.

9. The system of claim 1 wherein signal transitions that occur to close to previous transitions to be repeated between the first IC and the second IC via the interface are discarded and more widely spaced transitions and the steady-state value of the signals is repeated.

10. The system of claim 1 wherein the second IC comprises:
    protocol logic, coupled to the interface, to receive each of the in-band signals and to extract the state of each of the in-band signals; and
    sequential logic, coupled to the protocol logic, to maintain the state of each of the in-band signals once the state has been received.

11. A method comprising:
    monitoring the state of each of a plurality of signals at a first integrated circuit (IC); and
    transmitting the state of each of the plurality of signals in band across a single link interface to a second IC each time that a change in the state of one of the plurality of signals is detected.

12. The method of claim 11 wherein monitoring the state of each of a plurality of signals at the first IC comprises:
    monitoring a signal held value at protocol logic associated with each of the plurality of signals; and
    monitoring a send signal at the protocol logic associated with all of the plurality of signals.

13. The method of claim 12 further comprising:
    selecting a protocol point including all of the held values of the input signals simultaneously at the protocol logic; and
    integrating the protocol point into a protocol that is transmitted to the second IC via the interface.

14. The method of claim 13 further comprising:
    receiving the protocol point at the second IC; and
    extracting the state of each of the plurality of in-band signals.

15. A system comprising:
    a chipset;
    a single link-interface coupled to the chipset; and
    an integrated circuit (IC) coupled to the chipset, wherein the chipset simultaneously transmits the state of each of a plurality of signals not associated with the interface to the IC in-band via the interface each time that a change in the state of one of the plurality of signals is detected.

16. The system of claim 15 wherein the state of all of the plurality of signals is sampled at the chipset whenever any of the signals change.

17. The system of claim 15 wherein the IC drives each of the signals with new values received in-band each time that the plurality of signal values are received.

18. The system of claim 15 wherein the chipset comprises:
    signal logic associated with each of the plurality of signals; and
    protocol logic, coupled to the signal logic associated with each of the signals, to transmit the signal values in-band to the protocol to the IC.

19. The system of claim 18 wherein the signal logic includes:
    a first flip-flop with an input coupled to an associated signal and an output coupled to the protocol logic, the output of the first flip-flop generating a held signal value; and
    a second flip-flop having an input coupled to the output of the first flip-flop to receive the held signal value, the output of the second flip-flop generating a send signal.

20. The system of claim 18 wherein the signal logic includes:
    a flip-flop with an input coupled to an associated signal and an output coupled to the protocol logic, the output of the flip-flop generating a held signal value; and
    a counter having an input coupled to the output of the flip-flop to receive the held signal value, the output of the counter generating a send signal.

21. The system of claim 18 wherein the protocol logic selects a protocol point including all of the held signal values simultaneously and integrates the protocol point into a protocol that is transmitted to the IC via the interface.

22. The system of claim 21 wherein the protocol point being transmitted is changed each time a held signal transitions so that subsequent signal transitions are communicated with a short a latency.

23. The system of claim 15 wherein signal transitions that occur to close to previous transitions to be repeated between the chipset and the IC via the interface are discarded and more widely spaced transitions and the steady-state value of the signals is repeated.

24. The system of claim 15 wherein the IC comprises:
protocol logic, coupled to the interface, to receive each of the in-band signals and to extract the state of each of the in-band signals; and
sequential logic, coupled to the protocol logic, to maintain the state of each of the in-band signals once the state has been received.

* * * * *